(12) United States Patent
Eberlein et al.

(10) Patent No.: US 9,354,871 B2
(45) Date of Patent: May 31, 2016

(54) MULTI-STAGE PUSH NOTIFICATIONS FOR SOFTWARE LOGISTIC TOOLS

(71) Applicants: Peter Eberlein, Malsch (DE); Volker Driesen, Heidelberg (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 14/315,326

(22) Filed: Jun. 26, 2014

(65) Prior Publication Data

US 2015/0378725 A1    Dec. 31, 2015

(51) Int. Cl.
*G06F 9/44* (2006.01)
*H04L 29/06* (2006.01)
*H04L 29/08* (2006.01)

(52) U.S. Cl.
CPC  *G06F 8/77* (2013.01); *H04L 67/02* (2013.01); *H04L 67/42* (2013.01)

(58) Field of Classification Search
CPC ............ G06F 8/77; H04L 67/42; H04L 67/02
USPC ................................. 717/120, 127
See application file for complete search history.

(56) References Cited

U.S. PATENT DOCUMENTS

| | | | |
|---|---|---|---|
| 2013/0074102 A1* | 3/2013 | Carey ................. | G06F 9/542 719/318 |
| 2014/0330916 A1* | 11/2014 | Xu ..................... | G06F 9/542 709/206 |

\* cited by examiner

*Primary Examiner* — Anna Deng

(57) ABSTRACT

An incident associated with a software logistic tool occurs. At a host agent a notification for the incident is received. The host agent is associated with a corresponding host where the software logistic tool is running. The notification for the incident is pushed to a customer operation cockpit operating at a customer system landscape via a push channel for communication from the software logistic tool to the customer operation cockpit. The notification for the incident is received at the customer operation cockpit for a customer support user to analyze.

14 Claims, 6 Drawing Sheets

MULTI-STAGE PUSH NOTIFICATIONS FOR SOFTWARE LOGISTIC TOOLS

BACKGROUND

Typically, software vendors provide support to customers of their software systems. Support process of customers' software systems could be tedious and time consuming. Often, information technology (IT) administrators of a customer are responsible for a large number of systems, processes running on those systems, tools, etc. Typically, a central IT console operating at the customer system landscape works on a pull basis to retrieve operational status of respective software systems that operate at the customer system landscape. For example, the central IT console may be regularly calling a number of software logistic (SL) tools to retrieve an updated execution and runtime status of the tools. An example of SL tools may be SL Toolset provided by SAP. Regularly calling or requesting data from the SL tools may overload the central IT console and networks with unnecessary traffic, especially in larger customer system landscapes.

Further, the process from the time a customer's IT administrator acknowledges an error to the time the error is resolved may be slow. For example, a customer IT administrator observes errors or issues pulled from the SL tools by the central IT console. Then, the IT administrator analyzes the problem and may take the decision to create a ticket describing the problem and send the ticket to the support organization of the software vendor. The support organization in turn may request an online connection to the customer's system landscape to analyze the problem and may respond back to the ticket by providing solution guidance for the IT administrator to execute. This process is time consuming and delays resolution of problems that may occur with the SL tools.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for hybrid applications operating between on-premise and cloud platforms are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Typically, software vendors provide support at various levels such as maximum attention support or enterprise support. Fees for the support services are according to the level of quality of the services provided. In one embodiment, real-time support may be provided where customer IT administrators and vendor support and development experts are updated real-time with execution and runtime status of respective SL tools. SL tools automate, among others, system provisioning, software installation, patching, upgrade, configuration, etc. In one embodiment, multi-stage push notification communication is implemented by establishing push channels for communication across a customer system landscape and a vendor support center.

Figure 1:
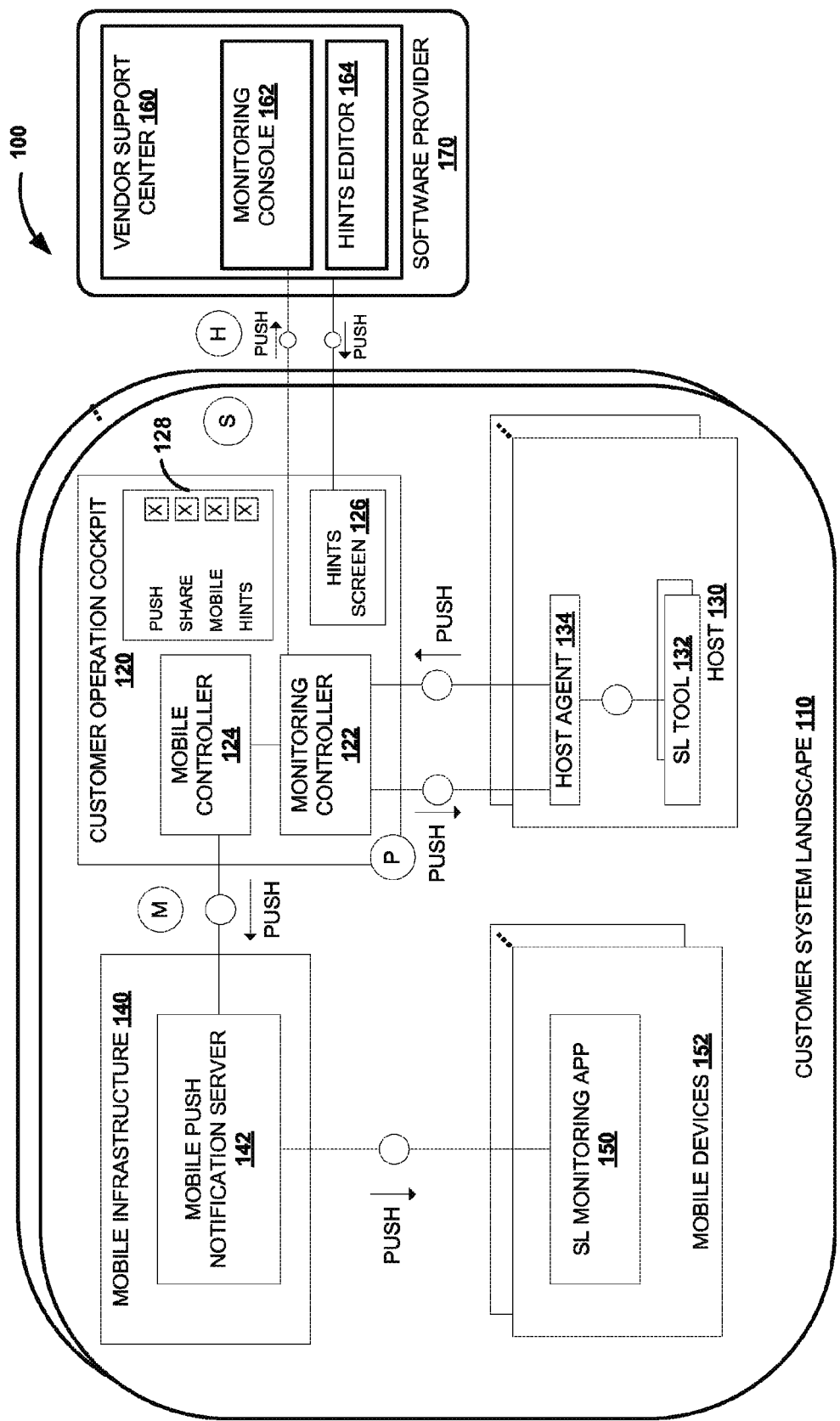
FIG. 1 illustrates an exemplary computer system for multi-stage incident push notifications for software logistic tools, according to one embodiment.

FIG. 1 illustrates an exemplary computer system 100 for multi-stage incident push notifications for software logistic tools, according to one embodiment. Customer system landscape 110 is an IT infrastructure that may include both physical hardware and software installed on that hardware, including software provided by one or More vendors or software providers. For example, a software logistic (SL) tool 132 may be installed on host 130, where SL tool 132 may be provided by software provider 170. Host 130 may be physical machine or virtual one, according to various embodiments. One or more SL tools may be installed on host 130. SL tools manage customer system landscape 110 throughout the lifecycle of the software provided by software provider 170 including, but not limited to, initial implementation of a software application, transport of changes, maintenance and upgrade of the systems within customer system landscape 110, etc.

Customer operation cockpit 120 is central console from where software supplied by software provider 170 installed on the hosts of customer system landscape 110 may be deployed and changed, managed, supported, monitored, etc. A corresponding host agent is associated with a host for remote management of the host via the host agent. For example, host agent 134 is associated with host 130. Host agent 134 is a process that runs on host 130 and may regularly pull SL tool 132 for runtime and execution status. Communication to software installed on host 130 is established via host agent 134. Customer operation cockpit 120 interfaces with one or more SL tools such as SL tool 132 via host agent 134. For example, instructions to SL tool 132 for starting, stopping, upgrading, or otherwise managing software installed on host 130 are routed through host agent 134. In one embodiment, a first stage or a first push communication channel from a multi-stage push notifications communication may be established from SL tool 132 to host agent. Host agent 134 may receive information or notifications pushed by one or More SL tools via the first push communication channel. Alternatively, host agent 134 may pull or Collect information from the one or more SL tools. An alternative implementation may be to call the SL tools from the customer operation cockpit 120 directly. In this case the tools take over the tasks of the host agent described below.

Hosts of customer system landscape 110 are registered with customer operation cockpit 120 to be managed from customer operation cockpit 120, for example, by an IT administrator or other support expert of the customer. In one embodiment, to configure computer system landscape 110 for multi-stage push notification communication, customer operation cockpit 120 sends parameters for communication to host agents of corresponding hosts that are registered with customer operation cockpit 120. In one embodiment, the parameters may include, but are not limited to, identification of monitoring controller 122, address of monitoring controller 122, callback credentials, etc. Upon receiving the parameters, host agent 134 establishes a push communication channel to monitoring controller 122 using the received callback credentials. Once the push communication channel between host agent 134 and monitoring controller 122 is established, host agent 134 may push information to customer operation cockpit 120. For example, host agent 134 may push notifications to monitoring controller 122 that includes runtime and execution status of SL tool 132. In addition, customer operation cockpit 120 may send to host agent 134 parameters for push communication from host agent 134 to mobile controller 124. In one embodiment, the parameters may include, but are not limited to, identification of mobile controller 124, address of mobile controller 124, callback credentials, etc. Upon receiving the parameters, host agent 134 establishes the push communication channel from host agent 134 to mobile controller 124 using the received callback credentials. In one embodiment, push notifications from host agent 134 to customer operation cockpit 120 may be a second stage or a first push channel from a multi-stage push notifications communication for SL tool 132.

A third stage or a third push channel of the multi-stage push notifications communication may be established between customer operation cockpit 120 and mobile push notification server 142 of mobile infrastructure 140. An example of mobile infrastructure 140 may be SAP® Mobile Platform provided by SAP. Mobile infrastructure 140 may include both hardware and software for creation, deployment, management, monitoring, etc., of mobile applications. An example of mobile push notification server 142 may be Apple Push Notification Server provided by Apple Inc. In one embodiment, once the push communication channel from customer operation cockpit 120 to mobile push notification server 142 is established, customer operation cockpit, and in particular mobile controller 124 may push information to mobile push notification server. When information is pushed to mobile push notification server 142 from customer operation cockpit 120 or another server, mobile push notification server 142 pushes or otherwise sends the information to one or more mobile devices such as mobile device 152. For example, mobile push notification server 142 may push notifications to an SL monitoring application 150, where the push notifications may include runtime and execution status of SL tool 132. SL monitoring application 150 may need to be configured to allow incoming push notifications.

Vendor support center 160 is a central system from where experts of software provider 170 may provide support for one or more SL tools supplied to one or more customers by software provider 170. One or more customer operation cockpits may be registered with vendor support center 160. Vendor support center 160 may receive push notifications and other information from one or more customer operation cockpits at monitoring console 162. In one embodiment, a fourth stage or a fourth push channel of the multi-stage push notifications communication may be established between customer operation cockpit 120 and monitoring console 162 of vendor support center 160 of software provider 170. Customer operation cockpit 120 sends parameters for push communication to monitoring console 162. For example, customer operation cockpit 120 may send identification of a customer's support expert and respective credentials of the customer's support expert. Vendor support center 160 verifies access permissions and authorizations of respective customer operation cockpits and associate the push notifications received from the customer operation cockpits with the customer operation cockpit from where the push notifications originate. Through the fourth push channel monitoring controller 122 may share monitoring data such as runtime and execution status for SL tool 132 with monitoring console 162. Therefore, runtime and execution status of SL tools may be proactively shared with the support organization of the software provider without submitting tickets for errors and incidents that may occur with the SL tools.

In one embodiment, customer operation cockpit 120 may distribute push notifications to a target audience of software provider 170 according to parameters included in the push notifications such as type of respective SL tool type. In one embodiment, a member of the target audience may send a hint to a customer support expert via hints editor 164 using the credentials sent by customer operation cockpit 120. The hint may be received at hints screen 126 of customer opera on cockpit 120 for the customer support expert to analyze.

In one embodiment, the multi-stage push communication channels may be enabled and disabled. For example, a combination of enabled push communication channels may be enabled by selecting or unselecting channels 128. The multi-stage push commination channels may be established to enable proactive communication or push notification from one or more SL tools throughout both the customer and vendor support centers. An advantage may be that the time from when an error or incident occurs with an SL tool to when support experts, of both the customer and the software provider, acknowledge the error may be reduced.

Figure 2:
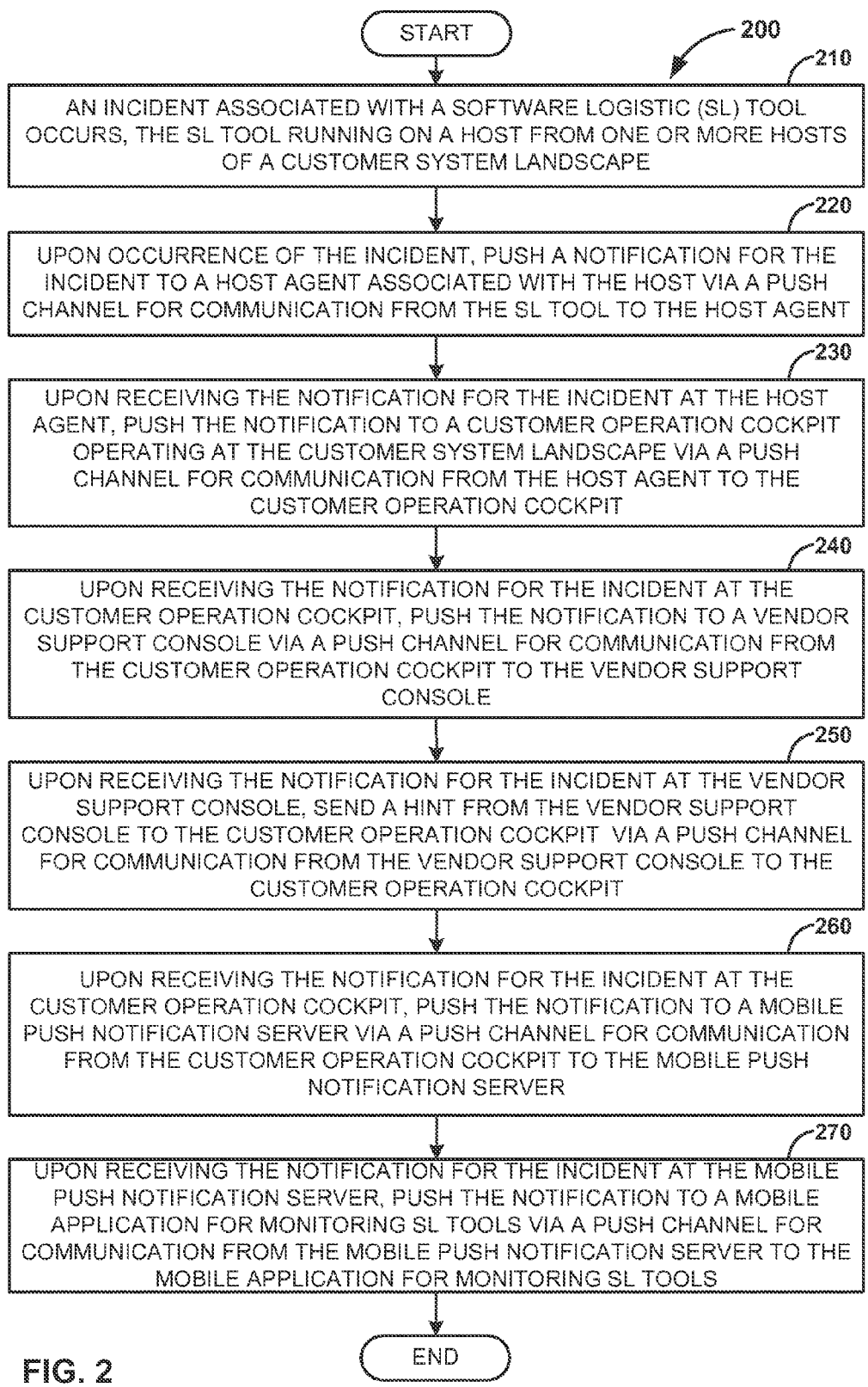
FIG. 2 illustrates a process for real-time incident reporting for software logistic tools, according to one embodiment.

FIG. 2 illustrates process 200 for real-time incident reporting for software logistic tools, according to one embodiment. At 210, an incident associated with SL tool occurs. For example, an error may occur during an update operation performed by the SL tool. The SL tool is running on a host from one or more hosts of a customer system landscape. Upon occurrence of the incident, at 220, a notification for the incident is pushed to a host agent associated with the host. The notification for the incident is pushed via a push channel for communication from the SL tool to the host agent.

Upon receiving the notification for the incident at the host agent, at 230, the notification is pushed to a customer operation cockpit operating at the customer system landscape via a push channel for communication from the host agent to the customer operation cockpit. Upon receiving the notification for the incident at the customer operation cockpit, at 240, the notification is pushed to a vendor support console via a push channel for communication from the customer operation cockpit to the vendor support console. For example, the notification may be pushed from monitoring controller 122 of customer operation cockpit 120 to monitoring console 162 of vendor support center 160 (FIG. 1).

Upon receiving the notification for the incident at the vendor support console, at 250, a hint is sent from the vendor support console to the customer operation cockpit via a push channel for communication from the vendor support console to the customer operation cockpit. For example, a development or support expert may monitor incidents pushed to a monitoring console of the vendor. Upon acknowledging the reported incident, the expert may proactively provide hints or other guidelines to the customer for resolving the reported issues via the push channel for communication from the vendor support console to the customer operation cockpit.

Upon receiving the notification for the incident at the customer operation cockpit, at 260, the notification is pushed to a mobile push notification server via a push channel for communication from the customer operation cockpit to the mobile push notification server. In turn, upon receiving the notification for the incident at the mobile push notification server, at 270, the notification is pushed to a mobile application for monitoring SL tools via a push channel for communication from the mobile push notification server to the mobile application for monitoring SL tools. Thus, a customer IT administrator may be proactively notified by pushing incident notifications to a mobile device of the customer IT administrator.

Figure 3:
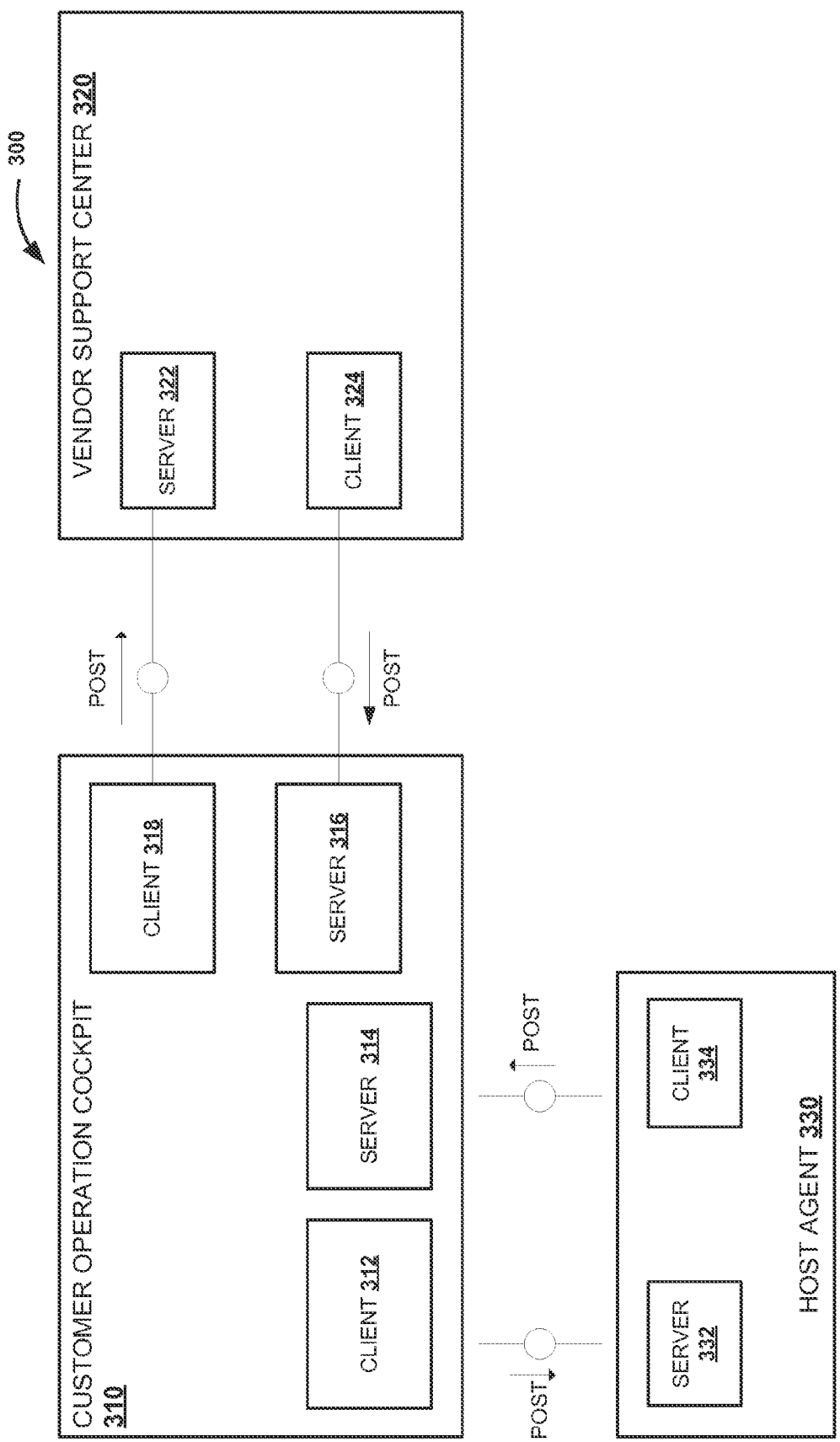
FIG. 3 illustrates exemplary computer architecture for multi-stage push notifications channels for monitoring of incidents associated with software logistic tools, according to one embodiment.

FIG. 3 illustrates exemplary computer architecture 300 for multi-stage push notifications channels for monitoring of incidents associated with software logistic tools, according to one embodiment. To establish push communication from host agent 330 to customer operation cockpit 310, client 312 posts or sends to server 332 information including an address of customer operation cockpit 320, a user for incoming push notifications, and credentials of the user to server 332 of host agent 330. Once the information is received at host agent 330 and the push notification channel is established from client 334 to server 314, push notifications may be sent or post by client 334 of host agent 330 to server 314 of customer operation cockpit 310 using the received address, user and the credentials of the user. Similarly, to establish push communication from vendor support center 320 to customer operation cockpit 310, client 318 posts or sends to server 322 information including the address of customer operation cockpit 320, the user for incoming push notifications, and the credentials of the user. Once the information is received at vendor support center 320 and push notification channel is established from vendor support center 320 to customer operation cockpit 310, hints or other push notifications may be pushed from client 324 to server 316 using the received address, user and the credentials of the user. In one embodiment, pushing components are implemented as Hypertext Transfer Protocol (HTTP) clients and components receiving push notifications are implemented as HTTP servers.

Figure 4A:
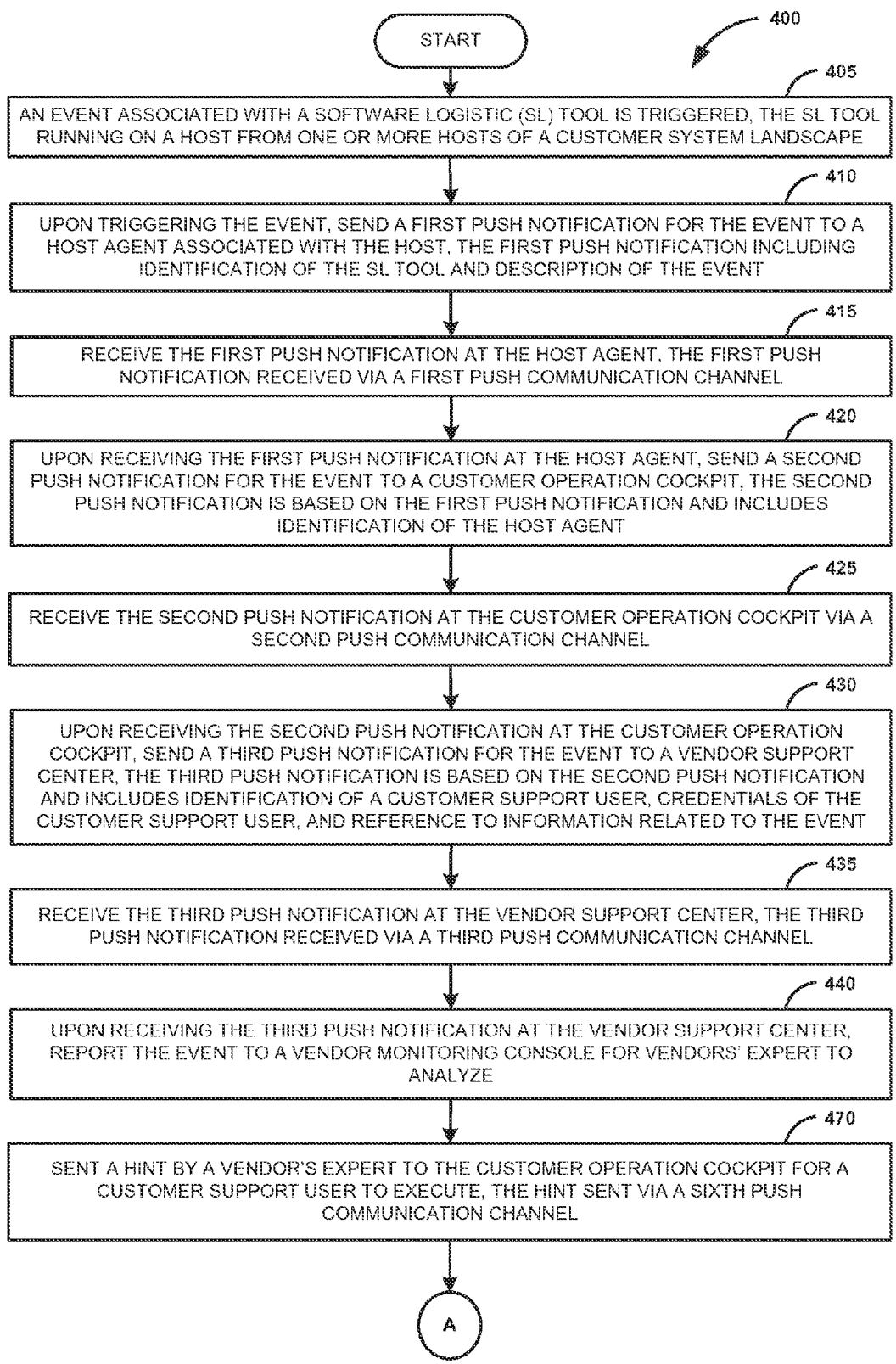
FIG. 4A illustrates a first part of a process to monitor software logistic tools in real-time, according to one embodiment.
Figure 4B:
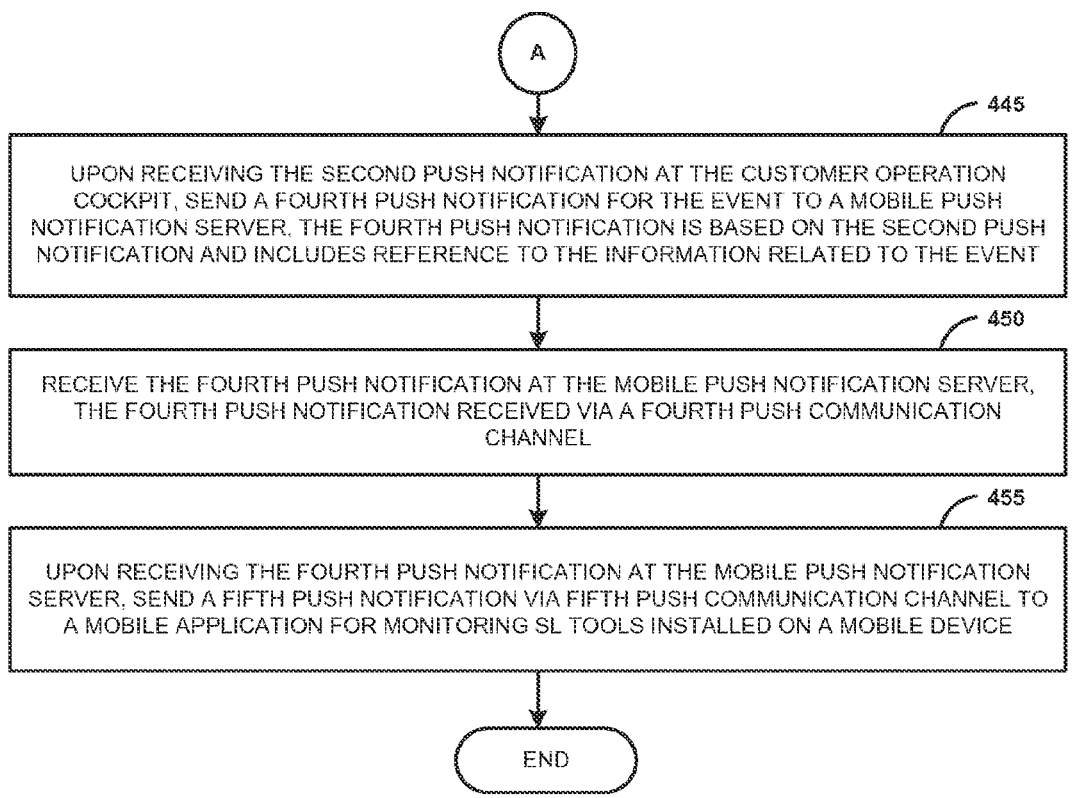
FIG. 4B illustrates a second part of the process to monitor software logistic tools, according to one embodiment.

FIG. 4A and FIG. 4B illustrates process 400 for real-time monitoring of software logistic tools, according to one embodiment. Process 400 starts at 405 when an event associated with an SL tool is triggered. For example, when a change event, e.g., change in runtime or execution status or an error occurs with the SL tool. The SL tool may be running on a host from one or more hosts of a customer system landscape. An example may be SL tool 132 running on host 130 of customer system landscape 110 (FIG. 1). The SL tool is provided by software provider or vendor to the customer such as software provider 170 in FIG. 1. The SL tool may be supported and maintained, on one hand, by one or more support experts of the vendor and, on the other hand, by one or more support experts of the customer.

Upon triggering the event, at 410, a first push notification for the event is sent to a host agent associated with the host. The first push notification may include, among other information, identification of the respective SL tool and description of the event. At 415, the first push notification is received at the host agent. The first push notification may be received via a first push communication channel from the SL tool to the host agent. Alternatively, the host agent may actively pull the SL tool for execution and runtime status.

Upon receiving the first push notification at the host agent, at 420, a second push notification for the event is sent to a customer operation cockpit. For example, the second push notification may be sent to monitoring controller 122 of customer operation cockpit 120 (FIG. 1). The second push notification is based on the first push notification, e.g., the second push notification includes the first push notification. In addition, the second push notification may include identification of the host agent. The second push notification sent to the customer operation cockpit by the host agent. At 425, the second push notification is received at the customer operation cockpit. For example, the second push notification may be received at monitoring controller 122 in FIG. 1. The second push notification may be received via a second push communication channel from the host agent to the customer operation cockpit.

Upon receiving the second push notification at the customer operation cockpit, at 430, a third push notification for the event is sent to a vendor support center. For example, the third push notification may be sent to monitoring console 162 of vendor support center 160 of software provider 170. The third push notification is based on the second push notification, e.g., the third push notification includes the second push notification. In addition, the third push notification may include identification of a customer support user, credentials of the customer support user, and reference to information related to the event (e.g., a link to a log file representing operational activity of the SL tool). At 435, the third push notification is received at the vendor support center. For example, the third push notification may be received at monitoring console 162 of vendor support center 160 (FIG. 1). The third push notification is received at the vendor support center via a third push channel for communication from the customer operation cockpit to the vendor support center.

At 440, upon receiving the third push notification at the vendor support center, the event is reported to a vendor monitoring console for one or more vendor's experts to analyze. Therefore, events or incidents related to runtime and execution status of SL tools are reported real-time to a central support center of the vendor by pushing the event or incident notification throughout the customer system landscape to the central support center of the vendor. In addition, additional information related to the reported events or incidents may also be proactively pushed to the central support center of the vendor. Once the event is reported to the vendor monitoring console and analyzed by the vendor's expert, at 470, a hint is sent by a vendor expert to the customer operation cockpit for support user of the customer to execute. In one embodiment, the hint may be sent via a sixth push communication channel from the vendor support center to the customer operation cockpit. The sixth push communication channel established using the credentials of the support expert of the customer. The hint may be sent by the vendor expert via a hints editor of the vendor support center. The hint may be displayed on a hints screen of the customer operation cockpit. For example, the hint may be pushed from hints editor 164 to hints screen 126 (FIG. 1). In one embodiment, upon receiving the hint at the customer operation cockpit, the customer support user may receive push notification for the hint at a mobile application for monitoring SL tools.

In one embodiment, the portion of process 400 illustrated in FIG. 4B may commence in parallel with step 430. Process 400 is not limited by the ordering of steps illustrated in FIGS. 4A and 4B. Upon receiving the second push notification at the customer operation cockpit, at 445, a fourth push notification for the event is sent to a mobile push notification server, according to one embodiment. For example, the fourth notification may be sent to mobile push notification server 142 of mobile infrastructure 140 by mobile controller 124 of customer operation cockpit 120 (FIG. 1). The fourth push notification is based on the second push notification, e.g., the fourth push notification includes the second push notification. In addition, the fourth push notification may also include a reference to information related to the event and credentials of the customer support user. At 450, the fourth push notification is received at the mobile push notification server. The fourth push notification may be received via a fourth push communication channel from the customer operation cockpit to the mobile push notification server. For example, the fourth push communication channel may be established from mobile controller 124 to mobile push notification server 142 (FIG. 1). Upon receiving the fourth push notification at the mobile push notification server, at 455, a fifth push notification is sent to a mobile application for monitoring SL tools installed on a mobile device. The fifth push notification is based on the fourth push notification and may include additional information. The fifth push notification is sent to the mobile application via a fifth push communication channel from the mobile push notification server to the mobile application for monitoring SL tools. Therefore, events or incidents related to runtime and execution status of SL tools are reported real-time to a mobile application by pushing the event or incident notification throughout the customer system landscape to the mobile device of a support expert or user of the customer.

Some embodiments may include the above-described methods being written as one or More, software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
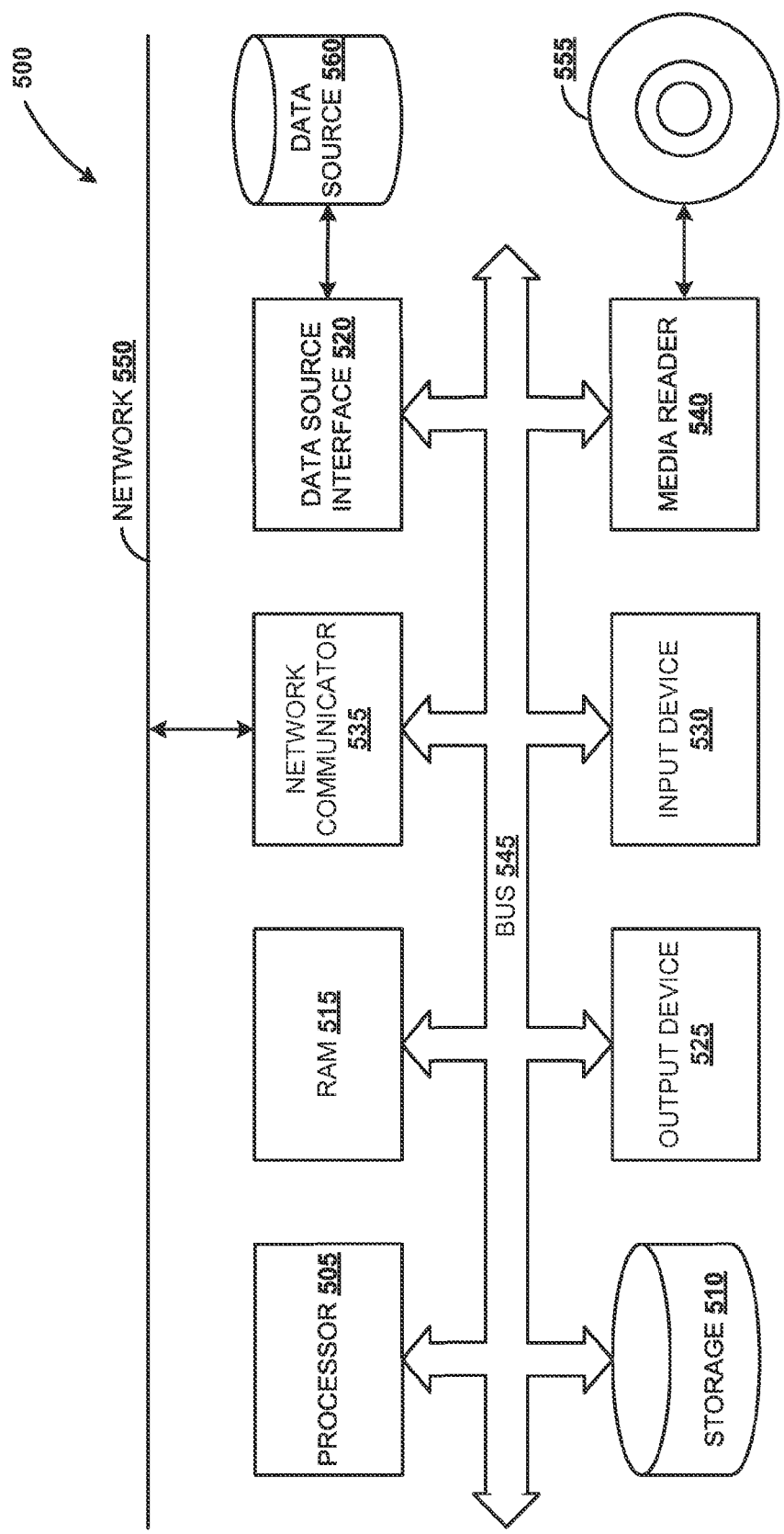
FIG. 5 illustrates an exemplary computer system, according to one embodiment.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. These output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to report real-time incidents associated with a plurality of software logistic tools, the method comprising:
    upon occurrence of an incident associated with a software logistic tool from the plurality of software logistic tools, receiving at a host agent a notification for the incident, wherein the host agent is associated with a corresponding host where the software logistic tool is running;
    pushing the notification for the incident to a customer operation cockpit operating at a customer system landscape, wherein the notification for the incident is pushed by the host agent via a first push channel for communication from the software logistic tool to the customer operation cockpit;
    receiving the notification for the incident at the customer operation cockpit for analysis;
    upon receiving the notification for the incident at the customer operation cockpit, pushing the notification to a vendor support console, wherein the notification for the incident is pushed by the customer operation cockpit via a second push channel for communication from the customer operation cockpit to the vendor support console; and
    upon receiving the notification for the incident at the customer operation cockpit, pushing the notification to a mobile push notification server operating at a mobile infrastructure of the customer system landscape, wherein the notification for the incident pushed via a fourth push channel for communication from the customer operation cockpit to the mobile notification server.

2. The computer implemented method of claim 1, further comprising:
    receiving the notification at the mobile push notification server; and
    upon receiving the notification at the mobile push notification server, pushing the notification to a mobile application for monitoring activity of the plurality of software logistic tools, wherein the notification for the incident pushed via a fifth push channel for communication from the mobile push notification server to the mobile application.

3. The computer implemented method of claim 1, further comprising:
    receiving the notification for the incident at the vendor support console; and
    upon receiving the notification for the incident at the vendor support console, sending a hint via a third push channel for communication from the vendor support console to the customer operation cockpit.

4. The computer implemented method of claim 3, further comprising:
    receiving the hint at the customer operation cockpit;
    upon receiving the hint at the customer operation cockpit, sending the hint to a mobile push notification server operating at a mobile infrastructure of the customer system landscape, wherein the hint sent via a push channel for communication from the customer operation cockpit to the mobile notification server; and
    upon receiving the hint at the mobile push notification server, sending the hint to a mobile application for monitoring activity of the plurality of software logistic tools via push channel for communication from the mobile push notifications server to the mobile application.

5. The computer implemented method of claim 1, further comprising:
    upon occurrence of an incident associated with a software logistic tool from the plurality of software logistic tools, pushing the notification for the incident to the host agent by the software logistic tool via push channel for communication from the software logistic tool to the host agent.

6. A computer system to report real-time incidents associated with a plurality of software logistic tools, the system comprising:
    a memory to store computer executable instructions;
    at least one computer processor coupled to the memory to execute the instructions, to perform operations comprising:
    upon occurrence of an incident is associated with a software logistic tool from the plurality of software logistic tools, receiving at a host agent a notification for the incident, wherein the host agent associated with a corresponding host where the software logistic tool is running;
    pushing the notification for the incident to a customer operation cockpit operating at a customer system landscape, wherein the notification for the incident is pushed by the host agent via a first push channel for communication from the software logistic tool to the customer operation cockpit;
    receiving the notification for the incident at the customer operation cockpit for analysis;
    upon receiving the notification for the incident at the customer operation cockpit, pushing the notification to a vendor support console, wherein the notification for the incident is pushed by the customer operation cockpit via a second push channel for communication from the customer operation cockpit to the vendor support console; and upon receiving the notification for the incident at the customer operation cockpit, pushing the notification to a mobile push notification server operating at a mobile infrastructure of the customer system landscape, wherein the notification for the incident pushed via a fourth push channel for communication from the customer operation cockpit to the mobile notification server.

7. The computer system of claim 6, wherein the operations further comprises:

receiving the notification at the mobile push notification server; and upon receiving the notification at the mobile push notification server, pushing the notification to a mobile application for monitoring activity of the plurality of software logistic tools, wherein the notification for the incident pushed via a fifth push channel for communication from the mobile push notification server to the mobile application.

8. The computer system of claim 6, wherein the operations further comprises:

receiving the notification for the incident at the vendor support console; and upon receiving the notification for the incident at the vendor support console, sending a hint via a third push channel for communication from the vendor support console to the customer operation cockpit.

9. The computer system of claim 8, wherein the operations further comprises:

receiving the hint at the customer operation cockpit;

upon receiving the hint at the customer operation cockpit, sending the hint to a mobile push notification server operating at a mobile infrastructure of the customer system landscape, wherein the hint sent via a push channel for communication from the customer operation cockpit to the mobile notification server; and upon receiving the hint at the mobile push notification server, sending the hint to a mobile application for monitoring activity of the plurality of software logistic tools via push channel for communication from the mobile push notifications server to the mobile application.

10. The computer system of claim 6, wherein the operations further comprises:

upon occurrence of an incident associated with a software logistic tool from the plurality of software logistic tools, pushing the notification for the incident to the host agent by the software logistic tool via push channel for communication from the software logistic tool to the host agent.

11. A non-transitory computer readable medium storing instructions thereon, which when executed by a processor cause a computer system to:

upon occurrence of an incident associated with a software logistic tool from the plurality of software logistic tools, receive at a host agent a notification for the incident, wherein the host agent is associated with a corresponding host where the software logistic tool is running;

push the notification for the incident to a customer operation cockpit operating at a customer system landscape, wherein the notification for the incident is pushed by the host agent via a first push channel for communication from the software logistic tool to the customer operation cockpit;

receive the notification for the incident at the customer operation cockpit for analysis;

upon receiving the notification for the incident at the customer operation cockpit, pushing the notification to a vendor support console, wherein the notification for the incident is pushed by the customer operation cockpit via a second push channel for communication from the customer operation cockpit to the vendor support console; and upon receiving the notification for the incident at the customer operation cockpit, push the notification to a mobile push notification server operating at a mobile infrastructure of the customer system landscape, wherein the notification for the incident pushed via a fourth push channel for communication from the customer operation cockpit to the mobile notification server.

12. The non-transitory computer readable medium of claim 11, wherein the instructions when executed by the processor cause the computer system further to:

receiving the notification at the mobile push notification server; and upon receiving the notification at the mobile push notification server, push the notification to a mobile application for monitoring activity of the plurality of software logistic tools, wherein the notification for the incident pushed via a fifth push channel for communication from the mobile push notification server to the mobile application.

13. The non-transitory computer readable medium of claim 11, wherein the instructions when executed by the processor cause the computer system further to:

receiving the notification for the incident at the vendor support console; and upon receiving the notification for the incident at the vendor support console, send a hint via a third push channel for communication from the vendor support console to the customer operation cockpit.

14. The non-transitory computer readable medium of claim 11, wherein the instructions when executed by the processor cause the computer system further to:

receive the hint at the customer operation cockpit;

upon receiving the hint at the customer operation cockpit, send the hint to a mobile push notification server operating at a mobile infrastructure of the customer system landscape, wherein the hint sent via a push channel for communication from the customer operation cockpit to the mobile notification server; and upon receiving the hint at the mobile push notification server, send the hint to a mobile application for monitoring activity of the plurality of software logistic tools via push channel for communication from the mobile push notifications server to the mobile application.

* * * * *